June 28, 1932.  H. E. HARING  1,865,004
REFERENCE ELECTRODE
Filed Oct. 25, 1930

INVENTOR
H. E. HARING
BY
E. V. Griggs
ATTORNEY

Patented June 28, 1932

1,865,004

UNITED STATES PATENT OFFICE

HORACE E. HARING, OF SUMMIT, NEW JERSEY, ASSIGNOR TO BELL TELEPHONE LABORATORIES, INCORPORATED, OF NEW YORK, N. Y., A CORPORATION OF NEW YORK

REFERENCE ELECTRODE

Application filed October 25, 1930. Serial No. 491,187.

This invention relates to reference electrodes and particularly to calomel electrodes or calomel half-cells as they are also called.

An object of the invention is to secure portability in half-cells.

A further object of the invention is to combine a half-cell and a second electrode in a compact and durable structure.

As the invention relates particularly to calomel half-cells the following description is devoted mainly to such half-cells. It should be understood however and will be evident from the description that the invention is applicable also to other half-cells such for example as the mercurous sulphate half-cell.

The use of standard cells, such as the Weston cell, is of course general as a source of constant known E. M. F. These cells usually consist of an H shaped vessel, one leg of which contains a mercury electrode and the other leg of which contains a cadmium amalgam electrode. The electrolyte, usually a saturated solution of cadmium sulphate fills the remainder of the vessel and, by virtue of the middle portion of the H, is brought into contact with both electrodes.

Calomel electrodes or calomel half-cells which are used commonly in laboratories in connection with the measurement of single potentials, may be said to be one-half of a standard cell, such as the Weston type. This accounts for their being referred to as half-cells.

The type of calomel half-cell in general use consists of a glass vessel, open at one end and closed at the other, with a platinum wire sealed through the closed end. A quantity of pure mercury is placed in the bottom of the vessel over which is placed a layer of pure calomel and this is then covered with a solution of potassium chloride saturated with calomel. An extension tube with a drain valve is usually provided on the vessel to allow flushing off contaminated potassium chloride. The mercury is the one electrode of the half-cell and the solution of potassium chloride and calomel is the electrolyte.

When used in determining the potential of a metal such as lead in contact with a liquid such as soil water the metal may be looked upon as the electrode and the liquid as the electrolyte of a second "half-cell" which is combined with the calomel half-cell in such a manner as to result in a complete cell having all the elements of the standard cell. This combination is brought about by conductively connecting the two electrolytes. The E. M. F. of this resulting cell is measured and, as this value is equal to the difference between the E. M. F. of the calomel half-cell (E. M. F. standard and known for each such half-cell) and that of the material being tested, the latter may be computed. (For a complete treatise on the structure and uses of calomel half-cells reference may be made to "Determination of Hydrogen Ions", by Clark published by Williams and Wilkins).

The type of calomel half-cell, which has been described, while satisfactory for use on the laboratory bench is somewhat fragile, cannot be conveniently moved about from job to job and must be kept in a substantially upright position at all times in order to prevent misplacement and leakage of the liquid electrolyte and electrode. It will be understood of course that it is necessary that the mercury electrode be maintained in the bottom of the vessel in contact with the platinum wire if the cell is to operate correctly. If for any reason the mercury is so misplaced as to bare the platinum wire or to allow the electrolyte to come into contact therewith it will be impossible to obtain accurate results with the half-cell.

Occasions often arise when it is desirable to obtain the accurate results made possible by use of the calomel half-cell but where the tests must be performed under such conditions that, due to the displacement of the electrode and electrolyte of the usual type of calomel half-cell, its use is practically prohibited.

This invention removes the positional limitations on the use of calomel half-cells and provides a half-cell which is portable in the fullest sense of the word and which is very convenient to move about and to use in any location.

According to one feature of the invention a sufficient amount of a jelly forming material, such as agar, is added to the liquid electrolyte to thicken it to such an extent that it will not only remain in its proper place in the vessel if the latter be inverted but will also serve to retain the liquid mercury in place in the end of the vessel.

According to a second feature of the invention the improved type of calomel half-cell is combined in a unitary structure with a second electrode, which may be lead, the particular desirability of producing such a structure being evident from the subsequent description.

It is known that calomel half-cells of a so-called portable nature have previously been described but in all of these an amalgamated platinum wire was depended upon as an electrode instead of pure mercury. Such a half-cell is not capable of producing the reliable results of the half-cell using pure mercury as an electrode.

Calomel half-cells constructed according to the present invention particularly when combined with a lead electrode according to the second feature of the invention, have proven especially useful in connection with investigations, in the field, of causes of corrosion of the lead sheaths of telephone or power cables.

One cause of such corrosion is the electrolytic action which is brought about by stray earth currents which may come, for example, from electric railway systems of the type employing grounded D. C. generators. These currents do not all return to the power house through the trolley rails but a certain portion enter the ground and follow sub-surface metallic structures such as the lead sheaths of cables. At points where such currents, after following the sheath for a distance, leave it and reenter the soil, lead is carried into solution and pitting and eventual perforation of the sheath results.

Another cause of cable sheath corrosion is so-called "galvanic action", the result of potential differences established upon the surface of the sheath by non-homogeneity either in the sheath itself or in its chemical environment.

Before curative measures can be applied it is necessary to determine which of the above types of corrosion is involved. Such determination involves the measurement first of the potential difference between an electrode composed of the same material as the cable sheath and the calomel electrode and second of the potential difference between the cable sheath itself and the calomel electrode. The first measurement gives the "static" potential of the sheath material and is, at any given point, an indication of the chemical environment while the second measurement gives the "dynamic" potential of the sheath i. e. the "static" potential as modified by a flow of current either on or off the sheath. The difference in volts between the two is polarization, a measure of the current involved.

During the investigations it is usual to perform the measurements at a plurality of points along the cable, recording the results in the form of a graphic chart. Those areas of the sheath which are shown to be most positive are known to be corroding. If the potential of the lead electrode is shown to be practically constant throughout the section undergoing test it is an indication that the corrosion is electrolytic while if the potential of the lead electrode varies considerably and in approximately the same manner as that of the sheath it is an indication that the corrosion is galvanic.

As has been pointed out, there has been combined into one compact structure the improved half-cell and an electrode of lead or lead alloy and it can readily be seen that such a structure greatly facilitates measurements of the nature described. This is evident when it is realized that such measurements must usually be made at points within the cable ducts, the half-cell and electrode being pulled along through the ducts from one manhole to another.

In order that the following detailed description may be more easily understood there is annexed hereto a sheet of drawings in which Fig. 1 is an elevation partially broken away of a portable calomel half-cell;

Figure 1:
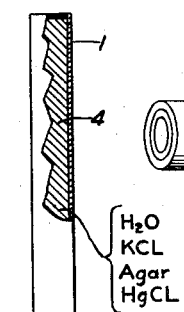

Referring now to Fig. 1, 1 is a cylindrical glass vessel open at one end and closed at the other with a platinum wire 2, sealed through the closed end and extending into the vessel a short distance. A quantity of very pure mercury 3, is placed in the bottom of the vessel and the vessel is then filled with the electrolyte 4. This electrolyte is composed of a saturated solution of potassium chloride and calomel to which has been added a sufficient quantity of agar to form the substance into a thick jelly-like composition of sufficient viscosity to retain the mercury in place in the bottom of the vessel whatever the position of the latter may be. This electrolyte is prepared by saturating water with potassium chloride and calomel, bringing the mixture to a boil and adding the required amount of agar. After cooking for a short time the agar will have mixed thoroughly with the calomel and potassium chloride and when the resultant composition has been allowed to cool it will be found to have the desired viscosity.

While the amount of agar which it is necessary to use varies somewhat with the characteristics of the material, it has been found that approximately three grams of agar per 100 cubic centimeters of solution is satisfactory.

When the half-cell is not in use it is preferable to seal the end of the vessel with paraffin wax or similar substance in order to prevent drying and shrinkage of the jelly electrolyte.

Figure 2:
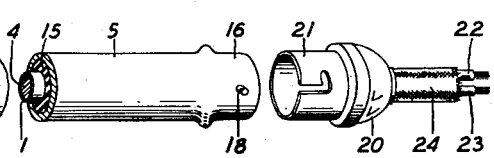
Fig. 2 is a perspective view with a portion cut away of a portable calomel half-cell combined with a lead electrode.
Figure 3:
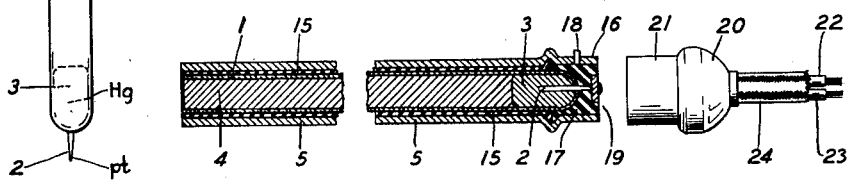
Fig. 3 is a sectional view of the cell shown in Fig. 2.

In Figs. 2 and 3 is shown the improved type of calomel half-cell combined with a cylindrical lead electrode 5. The lead cylinder, as shown, completely surrounds the half-cell thus serving as a means for protecting the glass vessel from breakage. The lead cylinder is provided at one end with a shouldered portion 16 in which is embedded a pin 18. A quantity of cement 17 fills the space between the vessel and the cylinder at the end of the latter and serves to hold the vessel firmly in place within the cylinder. The remainder of the space between the vessel and the cylinder is filled with paraffin wax 15 which aids in keeping the vessel in proper place within the cylinder. The platinum wire 2 is embedded in the cement 17 and extends through an aperture in brass disc 19 and is soldered to the outer surface thereof, the disc being also partially embedded in the cement 17 and supported thereby with its outer surface exposed. A "bayonet" connector 20 is provided for connecting the lead cylinder 5 and the platinum wire 2 to conductors 22 and 23 respectively of cable 24, these connections being made, in the case of the lead cylinder, through brass shell 21 to conductor 22 and, in the case of the platinum wire, through brass disc 19 and a center stud (not shown) provided in connector 20 to conductor 23.

While the cylinder has been described as "lead" it is as a matter of fact desirable that it be of the same material as the cable sheath or other metal being investigated. If, for example, the combined structure is being used in connection with investigations of a cable sheath of a lead-antimony alloy, the cylinder should also be of this alloy.

Figure 4:
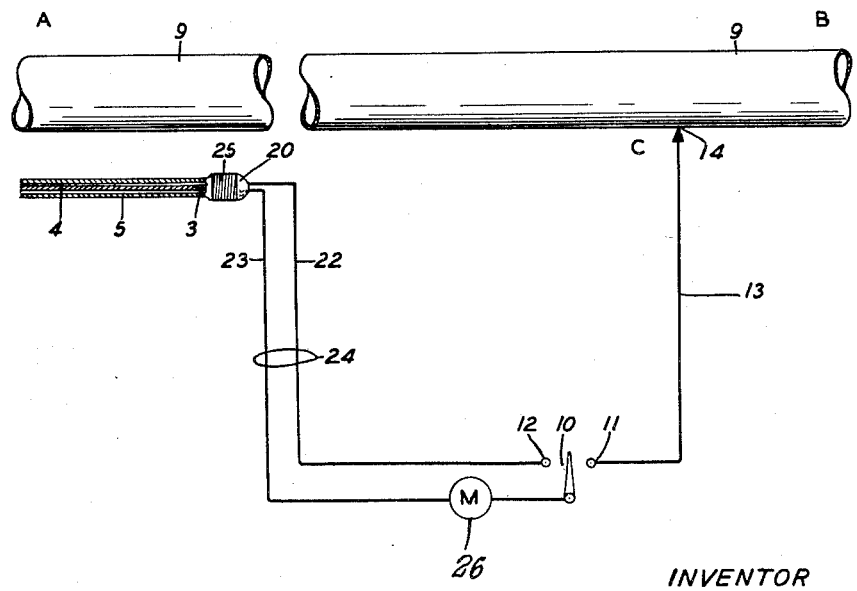
Fig. 4 is a schematic showing of the cell illustrated in Fig. 2 in use.

The type of structure illustrated in Figs. 2 and 3 is particularly useful in connection with measuring the potentials of lead cable sheaths and in order to better illustrate their usefulness Fig. 4 shows schematically how such measurements are made. Let it be assumed that it is desired to measure the potential of lead cable sheath 9 at points A and B in order to determine whether corrosion is taking place at these points, and if so whether electrolytic or galvanic corrosion is involved.

Apparatus including a switch 10 and measuring apparatus 26, which may be either a potentiometer of the portable type commonly used about the laboratory or a voltmeter of a type so designed as to draw a negligible current (such a voltmeter, known as a thermionic voltmeter, is referred to in Patent 1,232,919 granted to R. A. Heising, July 10, 1917) is set up at the point where the results of the tests are to be recorded, this being usually done at one of the manholes of the cable system. The combined structure shown in Fig. 2 is placed alongside of but not in contact with the cable sheath at point A, being placed either in the same duct or in an adjacent duct.

In order to prevent the brass shell 21 of the "bayonet" connector 20 from coming in contact with the surrounding soil it is covered with a few layers of rubber tape 25. The method of connecting the various pieces of apparatus is illustrated in the drawing.

It is necessary to find first the "static" potential of the lead at point A. To do this the arm of the switch 10 is placed on contact 12 which completes a circuit from the electrolyte and mercury electrode of the calomel cell through conductor 23, measuring instrument 26, switch arm and contact 12 of switch 10 through conductor 22 to the lead cylinder 5 and surrounding soil water, the latter two of which form for the time a second half-cell. It happens almost invariably that there is sufficient mud and water in the bottom of the duct to almost if not completely cover the combined calomel cell and electrode and this moisture conductively connects the electrolyte of the calomel cell and the soil water surrounding the lead electrode thus forming a complete cell, the E. M. F. of which is measured. This value is the "static" potential of the lead sheath at point A, an indication of the chemical nature of the soil at that point.

It is desirable next to determine the "dynamic" potential of the sheath at the same point and this is done by combining the sheath itself with the calomel half-cell instead of the lead cylinder. This is accomplished simply by shifting the switch arm to contact 11 which gives a circuit from the electrolyte and mercury electrode of the calomel half-cell, through conductor 23, measuring instrument 26, switch arm and contact 11 of switch 10 which is connected through a conductor 13 and a movable contact 14 to the cable sheath at some convenient point such as C. (Due to the conductivity of the lead sheath it is not necessary to locate contact 14 at or even very near the point being investigated but it may be located at any convenient point, e. g. in an adjacent manhole). Here again the cable sheath and surrounding soil water form a "half-cell" and, the soil water being connected through the moisture of the soil to the electrolyte of the calomel cell, a complete cell again results the E. M. F. of which is recorded. This value is the "dynamic" potential of the lead sheath at point A. If the last value is positive to the first corrosion is shown to be taking place and if the potential of the lead electrode is practically constant through the duct run, the corrosion is due to electrolytic action while if the potential of the lead electrode varies considerably and in the same manner as that of the cable sheath the corrosion is due to galvanic action.

After the tests have been completed at point A, the structure is pulled along through the duct to point B, the conductor 24 being used for this purpose, if desired. Tests are performed in the above manner at point B and as many other points as desired.

The use described is only one of many to which the improved half-cell may be put, both alone and in combination with a metal electrode. For example, the half-cell by itself can be advantageously substitued for the usual fragile type of half-cell in various commercial operations. In combination with the proper metal electrode it can be used in electrolytic processes to determine the extent of polarization.

What is claimed is:

1. A half-cell comprising a vessel open at one end, a liquid electrode and an electrolyte of sufficient viscosity to retain said electrode in place in the vessel if the latter be inverted.

2. A half-cell comprising a vessel open at one end, an electrode of mercury and an electrolyte of sufficient viscosity to retain the mercury electrode in place in the vessel if the latter be inverted.

3. A half-cell comprising a vessel open at one end, an electrode of mercury and an electrolyte consisting of water, potassium chloride, calomel and a jelly-forming substance.

4. A half-cell comprising a vessel open at one end, an electrode of mercury and an electrolyte consisting of water, potassium chloride, calomel and agar.

5. A half-cell consisting of a vessel, open at one end and closed at the other, a platinum wire sealed through the closed end, a quantity of mercury in the vessel at the closed end and a mixture of water, potassium chloride, calomel and agar covering said mercury.

6. In combination, a half-cell and a second electrode, the second electrode surrounding the half-cell.

7. In combination, a calomel half-cell and a metal electrode, the metal electrode surrounding the calomel half-cell.

8. In combination, a calomel half-cell and a lead electrode, the lead electrode surrounding the calomel half-cell.

9. A test device consisting of a calomel half-cell surrounded by a lead cylinder and conductive leads from both the half-cell and lead cylinder.

10. A test device consisting of a glass vessel containing mercury and a mixture of water, potassium chloride, calomel and agar, said vessel being surrounded by a lead cylinder, the two being separated by a film of paraffin wax, and conductive leads from the mercury and the lead.

In witness whereof, I hereunto subscribe my name this 20th day of October, 1930.

HORACE E. HARING.